United States Patent
Schormann (10) Patent No.: US 8,751,921 B2
(45) Date of Patent: Jun. 10, 2014

(54) PRESENTING ANNOTATIONS IN HIERARCHICAL MANNER

(75) Inventor: Christian Schormann, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 824 days.

(21) Appl. No.: 12/179,574

(22) Filed: Jul. 24, 2008

(65) Prior Publication Data

US 2010/0023851 A1 Jan. 28, 2010

(51) Int. Cl.
G06F 17/24 (2006.01)

(52) U.S. Cl.
USPC ........... 715/232; 715/203; 715/205; 715/230; 715/233; 715/853

(58) Field of Classification Search
USPC .............. 715/230, 232, 233, 203, 205, 853
See application file for complete search history.

(56) References Cited

U.S. PATENT DOCUMENTS

| | | | |
|---|---|---|---|
| 5,267,054 A | 11/1993 | Chang et al. | |
| 5,717,869 A | 2/1998 | Moran et al. | |
| 5,883,625 A | 3/1999 | Crawford et al. | |
| 6,014,127 A | 1/2000 | Blomqvist | |
| 6,279,014 B1* | 8/2001 | Schilit et al. | 715/234 |
| 6,297,798 B1 | 10/2001 | Evans et al. | |
| 6,771,276 B1 | 8/2004 | Highsmith et al. | |
| 6,847,363 B1 | 1/2005 | Sauvagean | |
| 7,093,192 B2 | 8/2006 | Mullen et al. | |
| 7,119,814 B2 | 10/2006 | Meron et al. | |
| 7,181,438 B1* | 2/2007 | Szabo | 1/1 |
| 7,224,847 B2 | 5/2007 | Zhang et al. | |
| 7,233,341 B1 | 6/2007 | Sauerbrei | |
| 7,246,311 B2 | 7/2007 | Bargeron et al. | |
| 7,430,535 B2* | 9/2008 | Dougherty et al. | 705/38 |
| 7,647,563 B2* | 1/2010 | Guido et al. | 715/853 |
| 7,668,889 B2* | 2/2010 | Edwards et al. | 707/766 |
| 7,809,731 B2* | 10/2010 | Collins | 707/748 |
| 7,962,846 B2* | 6/2011 | Lerner et al. | 715/230 |
| 2002/0097983 A1* | 7/2002 | Wallace et al. | 386/55 |

(Continued)

OTHER PUBLICATIONS

Anni Coden, Multi-Search of Video Segments Indexed by Time-Aligned, "Annotation of Video Content", pp. 1-12 https://researcher.ibm.com/researcher/files/us-smiyaza/haas-vista.pdf.*

(Continued)

Primary Examiner — Stephen Hong
Assistant Examiner — Mario M Velez-Lopez
(74) Attorney, Agent, or Firm — Kevin Sullivan; Kate Drakos; Micky Minhas (57) ABSTRACT

Ambient displays and electronic whiteboards are commonly used to present information during meeting or other appropriate settings. Many times graphical objects are displayed on ambient displays where users of the ambient display will create annotations to the graphical object to provide further comments, meaning, and/or context. Annotations on the ambient display may be recorded for later review. An effective way to present recorded annotations is through a hierarchical system that provides context to the annotations. Annotations may be defined as sets of annotations based upon a logical grouping (e.g. spatial density, temporal density, etc.). These sets can be displayed to users as annotation branches. One method for displaying annotations branches is with a timeline. Depending on where along the timeline a user is, different annotations and/or annotation branches are displayed in relation to one another (e.g. annotation branches that derive from another annotation branch are displayed in a hierarchical manner).

20 Claims, 9 Drawing Sheets

(56) References Cited

U.S. PATENT DOCUMENTS

| | | | |
|---|---|---|---|
| 2002/0108112 A1* | 8/2002 | Wallace et al. | 725/40 |
| 2003/0018502 A1* | 1/2003 | Rodriguez | 705/7 |
| 2003/0227455 A1 | 12/2003 | Lake et al. | |
| 2004/0165010 A1* | 8/2004 | Robertson et al. | 345/805 |
| 2004/0239693 A1 | 12/2004 | Mullen et al. | |
| 2004/0263537 A1 | 12/2004 | Faraday et al. | |
| 2005/0044106 A1* | 2/2005 | Duncan et al. | 707/104.1 |
| 2005/0068290 A1 | 3/2005 | Jaeger | |
| 2005/0160113 A1 | 7/2005 | Sipusic et al. | |
| 2005/0177303 A1* | 8/2005 | Han | 701/209 |
| 2005/0183009 A1 | 8/2005 | Hannebauer et al. | |
| 2005/0237321 A1 | 10/2005 | Young et al. | |
| 2006/0072828 A1 | 4/2006 | Silverbrook et al. | |
| 2006/0117273 A1* | 6/2006 | Smith et al. | 715/853 |
| 2006/0156246 A1 | 7/2006 | Williams et al. | |
| 2006/0161838 A1 | 7/2006 | Nydam et al. | |
| 2006/0259872 A1 | 11/2006 | Mullen et al. | |
| 2006/0288273 A1* | 12/2006 | Erol et al. | 715/512 |
| 2007/0146646 A1* | 6/2007 | Rodriguez, Jr. | 353/69 |
| 2007/0156435 A1* | 7/2007 | Greening et al. | 705/1 |
| 2007/0174761 A1* | 7/2007 | Lin et al. | 715/512 |
| 2007/0192416 A1* | 8/2007 | Gupta | 709/206 |
| 2007/0198561 A1* | 8/2007 | Lee et al. | 707/101 |
| 2007/0239828 A1* | 10/2007 | Patton et al. | 709/204 |
| 2007/0266304 A1 | 11/2007 | Fletcher et al. | |
| 2008/0025592 A1* | 1/2008 | Jerebko et al. | 382/132 |
| 2008/0098295 A1 | 4/2008 | Nelson et al. | |
| 2008/0201196 A1* | 8/2008 | Rowland | 705/9 |
| 2008/0294663 A1* | 11/2008 | Heinley et al. | 707/100 |
| 2009/0162024 A1* | 6/2009 | Bradicich et al. | 386/52 |
| 2009/0164904 A1* | 6/2009 | Horowitz et al. | 715/723 |
| 2009/0210779 A1* | 8/2009 | Badoiu et al. | 715/230 |
| 2009/0282366 A1* | 11/2009 | DeBlaey et al. | 715/823 |
| 2009/0327856 A1* | 12/2009 | Mouilleseaux et al. | 715/230 |
| 2010/0061634 A1* | 3/2010 | Howie | 382/176 |
| 2010/0115559 A1* | 5/2010 | Ellis | 725/53 |
| 2010/0185933 A1* | 7/2010 | Coffman et al. | 715/230 |
| 2010/0287236 A1* | 11/2010 | Amento et al. | 709/204 |
| 2011/0107369 A1* | 5/2011 | O'Brien et al. | 725/38 |
| 2013/0268525 A1* | 10/2013 | Kanai et al. | 707/723 |

OTHER PUBLICATIONS

RGraphGallery, addictedtor.free.fr, pp. 1-3 http://web.archive.org/web/20060419081535/http://addictedtor.free.fr/graphiques/RGraphGallery.php?graph=139.*

Muller, et al., "Multi-Level Annotation in MMAX", In Proceedings of the 4th SIGdial Workshop on Discourse and Dialogue, Sapporo, Japan, Jul. 4-5, 2003, pp. 198-207.

Mikovec, et al., "Visualization of Users' Activities in a Specific Environment", Proceedings of the 2007 Winter Simulation Conference, S. G. Henderson, B. Biller, M.-H. Hsieh, J. Shortie, J. D. Tew, and R. R. Barton, eds., Publication Date: Dec. 9-12, 2007, pp. 738-746.

Ide, et al., "GrAF: A Graph-Based Format for Linguistic Annotations", Proceedings of the Linguistic Annotation Workshop, Dated: Jun. 2007, pp. 1-8.

Huang, et al., "Ad-Hoc Collaborative Document Annotation on a Tablet PC", Dated: May 2, 2003, pp. 1-8.

"Final Cut Drawing Tool Plugins" http://www.lyric.com/fcp-plugins/drawing/grids/grids.htm.

Gross, Mark D., "Grids in Design and CAD", Proceedings of Association for Computer Aided Design in Architecture, Los Angeles, CA, Dated: 1991, 11 pages.

Kamel, et al., "Sketching Images Eyes-Free: A Grid-Based Dynamic Drawing Tool for the Blind", Proceedings of the fifth international ACM conference on Assistive technologies, SESSION: Multimodal technologies, Year of Publication: 2002, pp. 33-40.

"Visio 2000 Technical Edition", http://licenser.adm.gu.se/cth/pgm/Visio2000Tech.htm.

U.S. Appl. No. 12/177,886, filed Jul. 23, 2008, Schormann.

International Search Report cited in PCT Application No. PCT/US2009/050889 dated Mar. 19, 2010, 10 pgs.

International Preliminary Report on Patentability cited in PCT Application No. PCT/US2009/050889 dated Jan. 25, 2011, 6 pgs.

First Chinese Office Action cited in Chinese Application No. 200980129989.3 dated Sep. 12, 2012, 10 pgs.

Reply to first Chinese Office Action cited in Chinese Application No. 200980129989.3 dated Nov. 30, 1012, 11 pgs.

Non-Final Office Action cited in U.S. Appl. No. 12/177,886 dated Jan. 31, 2011, 20 pgs.

Reply to Non-Final Office Action cited in U.S. Appl. No. 12/177,886 dated May 2, 2011, 14 pgs.

Final Office Action cited in U.S. Appl. No. 12/177,886 dated May 12, 2011, 42 pgs.

Reply to Final Office Action cited in U.S. Appl. No. 12/177,886 dated Aug. 12, 2011, 17 pgs.

Chinese Notice of Allowance cited in Chinese Application No. 200980129989.3 dated Jan. 11, 2013, 6 pgs.

Non-Final Office Action cited in U.S. Appl. No. 12/177,886 dated Jul. 1, 2013, 55 pgs.

Reply Non-Final Office Action cited in U.S. Appl. No. 12/177,886 dated Oct. 1, 2013, 13 pgs.

Final Office Action cited in U.S. Appl. No. 12/177,886 dated Oct. 28, 2013, 47 pgs.

* cited by examiner

PRESENTING ANNOTATIONS IN HIERARCHICAL MANNER

BACKGROUND

Ambient displays and whiteboards are commonly used to display information for presentations, developmental meetings, and any other environment for presenting information. Annotations tools may be used to provide a means for adding annotations (e.g. text comments, audio, visual, etc.) to information displayed on ambient displays (e.g. graphic object). For example, a new car design graphic may be displayed on an ambient display. Viewers of the new car design graphic by may add comments to the graphic with an electronic pen or any drawing device. Preserving annotation activity allows a user to review what annotations were made on the ambient display.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure relates to presenting a hierarchical representation of a plurality of recorded annotations that preserves temporal context. The plurality of recorded annotations may comprise annotations recorded on an ambient display. The annotations may provide addition information (e.g. textual comments) about information (e.g. a graphic object) displayed on the ambient display. An annotation tree may be implemented to record, store, and organize the annotations "inked" (created) on the ambient display.

The recorded annotations are presented to a user using a hierarchical timeline to provide history and context for annotation activity on the ambient display. For example, annotations are displayed in a horizontal position that represents that time the annotation was created. If the annotation is in response to an existing annotation (e.g. annotation of an existing annotation, comment on an existing annotation, etc.), then the annotation branches off from the existing annotation (e.g. displayed subordinate to the existing annotation), thus creating a horizontal timeline "tree". One method for presenting recorded annotations is to define one or more sets of annotations that are logically grouped (e.g. spatial proximity, temporal proximity, annotations that comment on the same annotation, etc.) to form annotation branches. An ambient display may present to a user a timeline representing recorded annotations. Annotation thumbnails and/or annotation branches (sets of annotations) may be displayed at a location near the timeline based upon some criteria (e.g. fixed time interval, temporal density, spatial density, text recognition, zoom state, filter, etc.). Moving a timeline marker allows a user to display a snapshot of recorded annotations and/or objects that were record at a corresponding time.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

This disclosure relates to presenting a hierarchical representation of a plurality of recorded annotations. Annotations may be electronic ink, audio, text, video, or any other notation or modification to an object that further gives meaning, context, or detail that enhances the value of the original object. One environment that annotation tools are commonly used is a whiteboard and/or ambient display. The ambient display is a device that displays information the in form of graphics. Users of the ambient display may create ("ink") an annotation with an electronic pen, fingers, or any other appropriate drawing device.

An example of an ambient display with an annotation tool is a meeting board where car designers display a graphical representation of the mockup version of the car on the board. During the meeting or any other time period, car designers can create annotations on the board to provide context to the mockup version of the car. An example of an annotation is a textual comment discussing the color of the car, the type of tire tread, or any other textual comment that is created on the board.

Recording annotations that are "inked", on an ambient display, over time provide the advantage of later reviewing what comments were made while the graphic was on the ambient display (e.g. comments "inked" on the ambient display during a meeting). A problem that arises from recording annotations is providing the context of the annotation. Many times annotations are "inked", "inked" over, erased, annotated (commented on), or any other manipulations to the annotation. Because annotations may be based on other annotations, it is advantageous to provide context for which the annotations were made. For example a first annotation may be created. A second annotation is created that comments on the first annotation. Then the first annotation is erased and/or annotated over. Recording annotations into a hierarchical structure captures this type of annotating, so that context of an annotation (e.g. what is being annotated) is not lost. Multiple branches of discussions (e.g. "comment-countercomment" sessions) are preserved in order to make use of the content on the ambient display.

A common method for presenting annotations is through a timeline. The timeline may present a visual representation of a portion of a time duration that annotations were recorded over. A timeline displays a single layer of annotations. This representation of annotations does not preserve multiple branches of discussion. To overcome this drawback, annotations may be stored and/or organized into an annotation tree. The annotation tree allows for multiple branches of annotations to be stored based on a logical grouping. A branch of annotations may represent annotations that are related by close temporal proximity (annotations that occurred within a close amount of time), close spatial proximity (annotations located close to one another on the ambient board), and/or one or more series of recorded annotations that relate back the same recorded annotation (e.g. a first annotation is made, then five annotations are made that comment on the first annotation, the five annotations become a new separate annotation branch within the annotation tree).

For example, annotations may be displayed in a horizontal position that corresponds to the time the annotation was created. If an annotation is in response to an existing annotation (e.g. annotation of an existing annotation, sub-ordinate to an existing annotation), then the annotation branches off (e.g. is displayed in a subordinate manner) from the existing annotation, thus creating a horizontal timeline "tree".

An annotation tree is one method of storing and/or organizing a plurality of recorded annotations. A hierarchical representation for presenting a plurality of recorded annotations may be achieved by displaying the branches of the annotation tree. An example of a hierarchical representation is where a timeline is displayed to a user (reviewing annotations). Depending on user specified input (e.g. a time range interval, annotation density criteria, spatial criteria, keyword search, etc.), annotation branches and/or thumbnails are displayed to the user. The displayed annotation branch represents a set of annotations that are logically grouped (e.g. by time, space, same parent annotation, etc.).

One way annotation branches may be displayed is by a first annotation branch representing annotations. With respect to the example of the car designers using the ambient display and the annotation tool, a annotation branch could be the color of the car. A second annotation branch is then displayed subordinate (e.g. below, connected to the first annotation branch with an indent, outline style, etc.) to the first annotation branch. The second annotation branch is displayed subordinate because of some logical hierarchical organization (e.g. the second annotation branch comprises annotations that comment on the annotations of the first annotation branch). This method of presenting a synonymous view provides the user the ability to recognize where an annotation comments on a previous annotation, thereby giving context to annotations.

Figure 1:
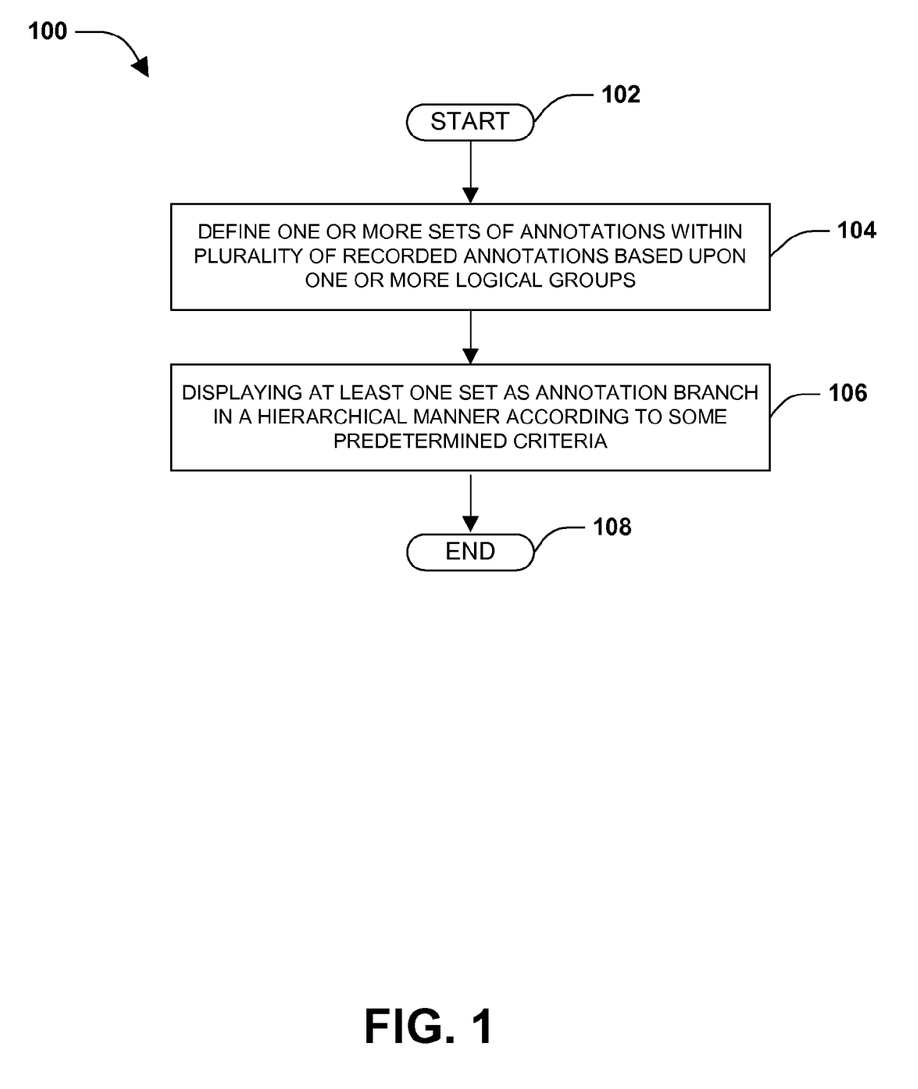
FIG. 1 is an illustration of an exemplary method for presenting a hierarchical representation of a plurality of recorded annotations.

One embodiment of presenting a hierarchical representation of a plurality of recorded annotations is illustrated by an exemplary method 100 in FIG. 1. At 102 the method begins. At 104, a set of one or more annotations within a plurality of recorded annotations is defined based upon one or more logical groupings. The recorded annotations may be stored or recorded in real time. The plurality of recorded annotations may be stored within an annotation tree or any other structure for storing annotations. The set of recorded annotations that is defined may be based on logical groupings, such as, a set of recorded annotations that are related by close temporal proximity; recorded annotations that are related by close spatial proximity; one or more series of recorded annotations that relate back (subordinate to) the same recorded annotation; and/or any other logical grouping for recorded annotations. The sets of recorded annotations may be stored in memory as an annotation branch of an annotation tree.

At 106, at least one set is displayed as an annotation branch in a hierarchical manner according to some predetermined criteria. Examples of predetermined criteria are: a fixed time interval (e.g. display all annotations from Monday); temporal density of recorded annotations (e.g. display a time range of annotations when there was greatest recording of annotations within an hour interval); spatial density of recorded annotations (e.g. display all annotations within an area around the graphic of the ambient display that a majority of recording took place); and text recognition of a keyword (e.g. administrator defined searchable keywords). The predetermined criteria may determine which annotations, the order of annotations, and/or how annotations are displayed, for example. At 108, the method ends.

Figure 2:
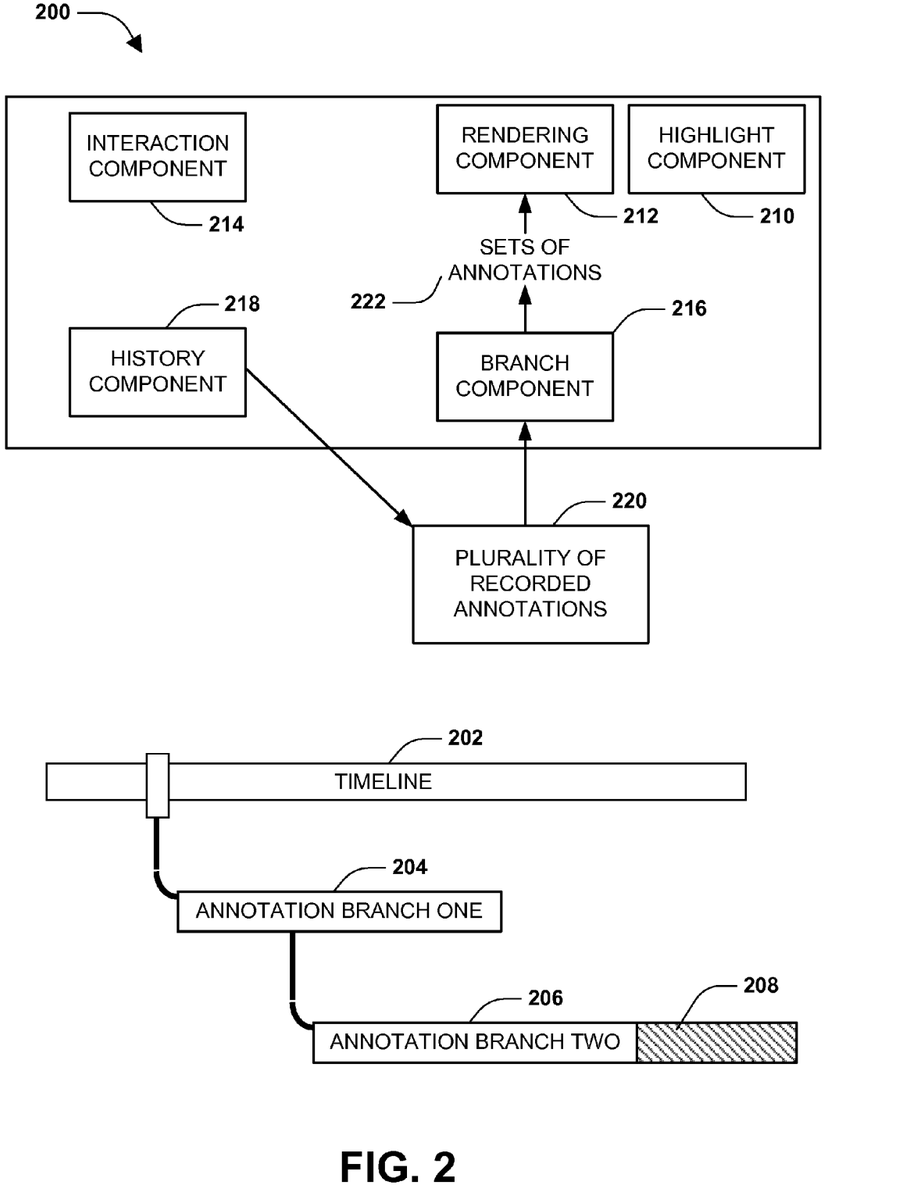
FIG. 2 is an illustration of an exemplary system configured to present a hierarchical representation of a plurality of recorded annotations.

FIG. 2 illustrates an example of a system 200 configured to present a hierarchical representation of a plurality of recorded annotations 220. The system 200 comprises a highlight component 210, a rendering component 212, an interaction component 214, a branch component 216, and a history component 218. The branch component 216 is configured to define one or more sets of annotations 222 within the plurality of recorded annotations 220 based upon one or more logical groupings. The branch component 216 may be configured to define the sets of annotations 222 by creating annotation branches. The branch component 216 may create annotation branches based upon recorded annotations of close temporal proximity, close spatial proximity, a series of recorded annotations that relate back to the same recorded annotation, and/or any other logical grouping for recorded annotations.

The rendering component 212 is configured to display at least one of the sets of annotations 222 as an annotation branch in a hierarchical manner according to some predetermined criteria. An example is an annotation branch one 204 and an annotation branch two 206. Annotation branch two 206 is displayed subordinate to annotation branch one 204. One reason for this hierarchical representation is to preserve the context of annotations. The recorded annotations of branch two 206 may comprise recorded annotations that commented on recorded annotations of annotation branch one 204. The rendering component 212 may use a timeline 202 to display recorded annotations, thumbnails of recorded annotations, annotation branches, and/or any other annotation data.

The rendering component 212 may display annotation branches, annotation thumbnails, snapshots of annotations based upon the predetermined criteria, such as, fixed time interval, temporal density of recorded annotations, spatial density of recorded annotations, text recognition of a keyword, and/or user input corresponding to changing the display time range (interval) of the timeline. The rendering component 212 may display snapshots of annotations on a display based upon a timeline marker (e.g. the snapshot corresponds to the "state" of an ambient display where annotations were created). The rendering component 212 may also display deleted annotations and/or overlapping annotations. This gives a user reviewing the presentations of recorded annotations the ability to follow the flow of what happened on an ambient display. Many time annotations are erased and/or new annotations are "inked" over the previous annotations. For example, displaying deleted annotations may provide context to how a meeting progressed while using an ambient display. Previous (deleted) annotation may comprise highly relevant information that a user reviewing the meeting would want to see in context with other annotations. A user may move along the timeline 202 to see if annotations are added or removed in order.

The highlight component 210 is configured to display a highlighted area 208 of the timeline 202 and/or annotation branch 206. An area may be defined as a time segment or any other designation of an area. The highlighted area may represent recorded annotations where a lot of activity took place and/or a portion of time comprising recorded annotations of high relevance. An example of a highlighted area is where a recorded annotation was voted on by users as having high relevance. This recorded annotation could be highlighted as a "hotspot" that could be easily found and reviewed later within the timeline 202. The ability to quickly locate relevant annotations increases the efficiency of reviewing annotations because the annotations may be recorded over long periods of time (e.g. days or weeks). A person reviewing the annotations would not want to spend an entire day or week reviewing the annotations to find a relevant annotation. Other criteria for highlighting an area could be areas with high spatial density or temporal density, which indicates areas of high activity.

The highlight component 210 may also highlight an area of the timeline 202 and/or annotation branch 206 by changing the background gradient corresponding to the recorded annotation density. An example is where more color (e.g. darker) is provided in areas where there are more annotations within a particular time segment. This provides the user with a sense of annotation density, which allows the user to quickly move through a timeline of many annotations to get to an area (time segment) where a lot of activity (annotating) took place on the ambient display.

The history component 218 may be configured to store at least one new recorded annotation into the plurality of recorded annotations 220. The history component 218 may be implemented in real time or when organizing recorded annotations. The history component 218 may group the plurality of recorded annotations into an annotation tree. This is advantageous because the branch component 216 may easily define sets of recorded annotations (as annotation branches) when recorded annotations are organized into an annotation tree.

The interaction component 214 may be configured to merge at least one annotation branch with another annotation branch based upon a user input. This gives the user the ability to manage annotations and/or combine annotation branches. One reason to merge annotation branches is because both branches comprise recorded annotations that are logically similar, such as in the car designer example using an ambient display with the annotation tool, a first branch about potential car colors is formed and a second annotation branch about car paint costs is then added. The interaction component 214 may also compare annotation branches based upon user input. A user may view a synonymous view of annotation branches of an annotation tree (plurality of recorded annotations) to compare and/or merge the annotation branches visually. The interaction component 214 may also create a new annotation branch when a user adds an annotation to a previously recorded annotation.

Figure 3:
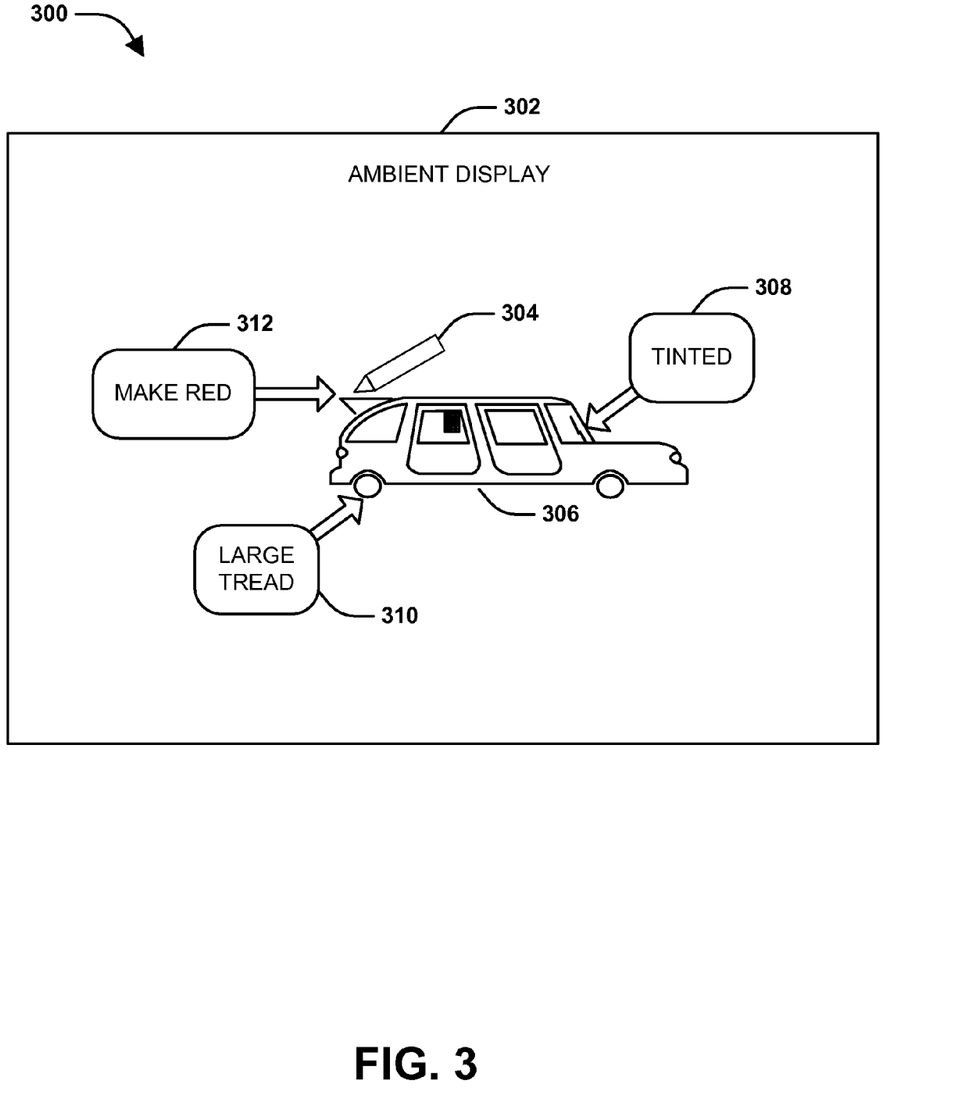
FIG. 3 is an illustration of creating annotations onto an ambient display.

FIG. 3 illustrates an example 300 of "inking" (creating), with an electronic pen 304, annotations 308, 310, 312 onto an ambient display 302. Different participants of a meeting pertaining to the development of a new car style 306 may user the electronic pen 304 to "ink" annotations onto the ambient display 302. A single or multiple users may create annotations, erase annotations, annotate (comment on) other annotations. The tinted annotation 308, large tread annotation 310, and make red annotation 312 may be recorded into a plurality of annotations. The plurality of annotations may be stored and/or organized in an annotation tree or any other structure for later review. Annotations that are erased (deleted) or "inked" over may be further recorded to provide context of the flow for the meeting.

Figure 4:
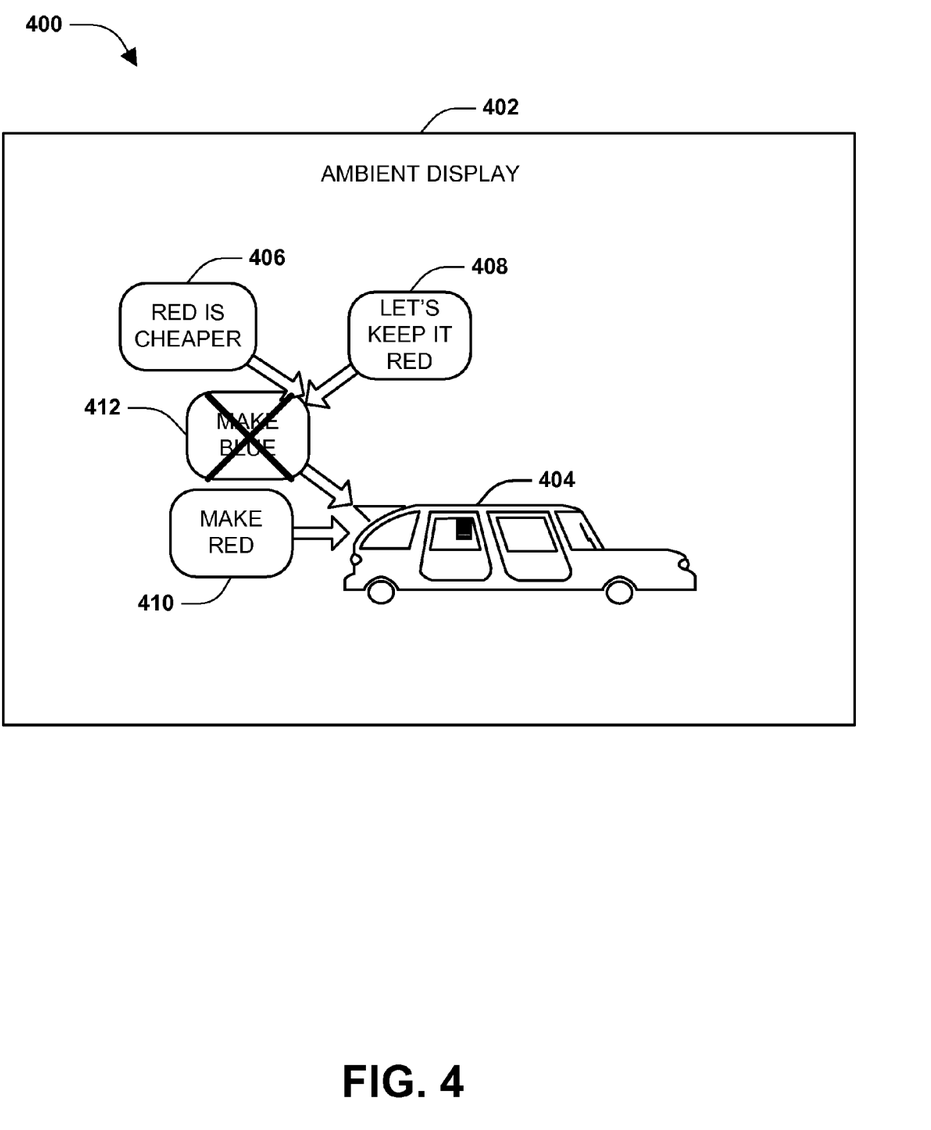
FIG. 4 is an illustration of creating annotations onto an ambient display.

FIG. 4 illustrates an example 400 of creating ("inking") annotations 406, 408, 410, and 412 onto an ambient display 402. The ambient display 402 comprises a new car style graphic 404. Different participants of the meeting pertaining to the development of a new car style may "ink" annotations onto the ambient display 402 regarding the new car style graphic 404. The make red annotation 410 may have been made to refer to a paint color for the new car style. The make blue annotation 412 is an annotation that comments (annotates) on the make red annotation 410. The make blue annotation 412 begins a comment-countercomment session that provides multiple branches of discussion on the ambient display 402. The following annotations: red is cheaper annotation 406 and let's keep it red annotation 408 continue the discussion branch started by the make blue annotation 412.

An example of the order the annotations were created could be: first, make red annotation 410 is "inked"; second, make blue annotation 412 is "inked"; third, red is cheaper annotation 406 is "inked"; fourth, let's keep it red annotation 408; and finally, the make blue annotation 412 is erased (deleted). The history of the annotation creation and/or deletion may be recorded and/or later viewed by a user. Presenting annotations within the context the annotations were created (e.g. which annotations commented on other annotations, what annotations were deleted, etc.) provides the user with a more meaningful experience.

One method for storing and/or organizing the recorded annotation for later presenting and/or reviewing them is to store the annotations within an annotation tree. The make red annotation 410 is an annotation branch. The make blue annotation 412, red is cheaper annotation 406, and the let's keep it red annotation 408 are a separate annotation branch that may be displayed subordinate to the make it red annotation branch. One method for using the annotation tree and branches is to display the branches as hierarchical representations of the recorded annotations. This allows a user to review the recorded annotations on the ambient display from the meeting with context. The user is provided information by the hierarchical structure to indicate that the make blue annotation 412, red is cheaper annotation 406, and the let's keep it red annotation 408 are part of annotations that comment on make it red annotation 410. The user may also be provided with information that the blue annotation 412 was deleted.

Figure 5:
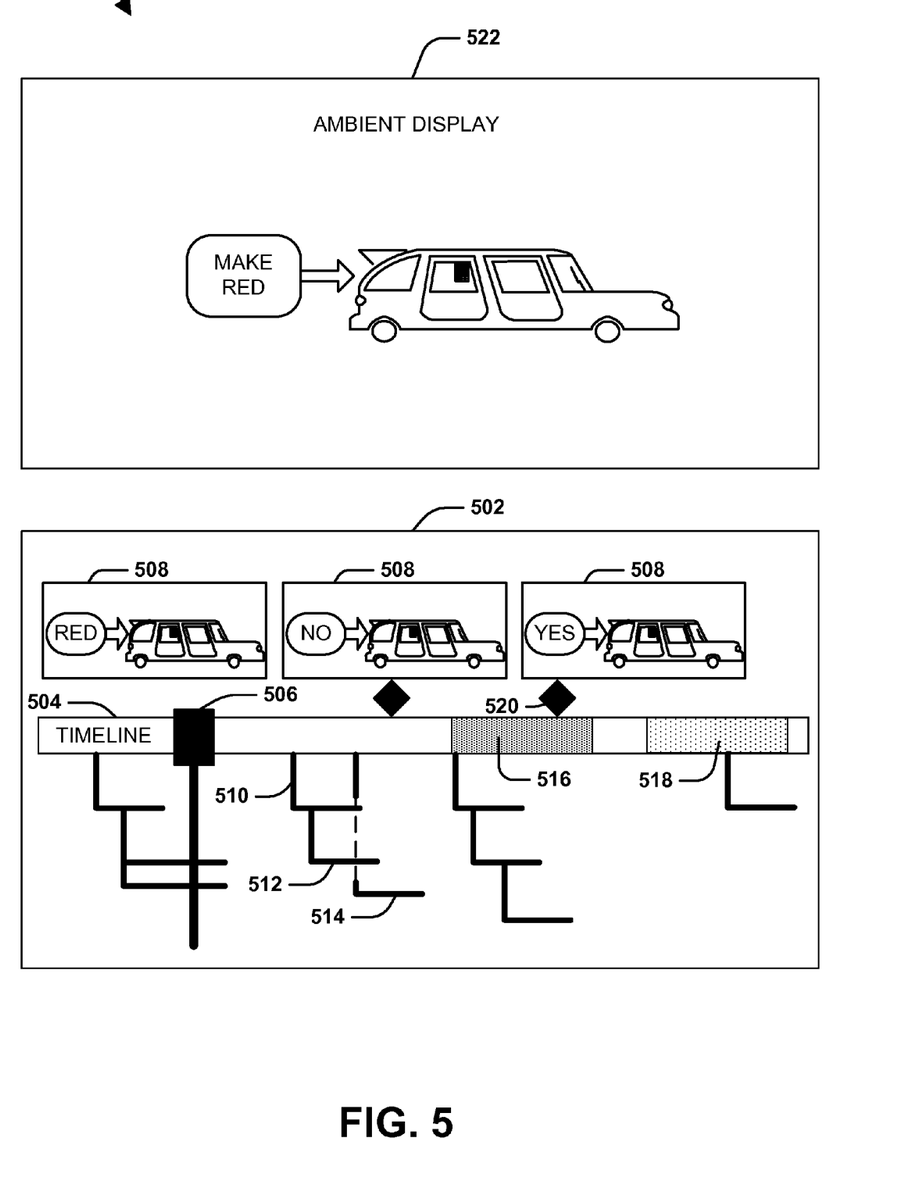
FIG. 5 is an illustration of an example of presenting a hierarchical representation of a plurality of recorded annotations.

FIG. 5 illustrates an example 500 of presenting a hierarchical representation of a plurality of recorded annotations. The system of example 500 comprises a timeline auxiliary display 502 and an ambient display 522. The timeline auxiliary display 502 may present to a user a configuration comprising: a timeline 504, a timeline slider 506, annotation branches (e.g. a branch (1) 510, a branch (2) 512, and a branch (3) 514), and a set of thumbnails 508. The timeline auxiliary display 502 may further comprise hotspot markers (e.g. a hotspot marker 520) indicating areas of interest (e.g. annotations voted as "hot"). The timeline 504 comprises a background gradient (e.g. a gradient density (1) 516 and a gradient density (2) 518) that may indicate annotation density.

The timeline 504 represents a series of annotations that may have been previously record from an electronic whiteboard (e.g. an ambient display). A user may move the timeline slider 506 along the timeline 504. Moving the timeline slider 506 may change what is displayed within the ambient display 522. The ambient display 522 presents to the user the current state (e.g. a snapshot of annotations and objects that were on the electronic whiteboard at a time corresponding to the position of the timeline slider 506 on the timeline 504). For example, an electronic whiteboard may have been used during a previous meeting where annotations were recorded from the electronic whiteboard. A user has the ability to review the meeting (e.g. see what annotations and objects were created on the electronic whiteboard during the meeting) by using the timeline auxiliary display 502. When the user moves the timeline slider 506 to a specified time on the timeline 504, the ambient display 522 presents what objects and annotations were on the electronic whiteboard corresponding to the time indicated by the timeline slider 506. The ambient display 522 allows the user to view the snapshot of annotations and objects that were currently on the electronic whiteboard at a specific time.

The timeline auxiliary display 502 presents the set of thumbnails 508 at an area close to the timeline 504. The thumbnails correspond to annotations that are recorded along the timeline 504. One possible configuration is where the thumbnail is located in an area close to the timeline representing the time period when the thumbnail (annotation) was recorded. The thumbnails may comprise an annotation, a portion of an annotation, an object that was on the electronic whiteboard, a snapshot comprising an annotation, and/or other information relating to the corresponding annotation of the thumbnail.

The timeline auxiliary display 502 presents a hierarchical representation of annotation branches. The branch (1) 510, branch (2) 512, and branch (3) 514 are presented to the user in a hierarchical manner. The hierarchical representation provides a user with context information regarding annotations and their relationship to other annotations. An example of providing context information through a hierarchical representation is the manner in which branch (1) 510 and branch (2) 512 are displayed. Branch (1) 510 represents annotations that are logically grouped together. Branch (2) 512 branches off of branch (1) 510 because the annotations comprised within branch (2) 512 relate back to annotations from branch (1) 510. It may be that the annotations in branch (2) 512 comprise annotations that commented on annotations from branch (1) 510. This provides comment-counter comment information to the user through the visualization of the hierarchical representation.

A further example is where branch (1) 510 comprises annotations about the color of a car (the car was an object within an electronic whiteboard where annotations were created to provide useful information regarding the car). The annotations of branch (2) 512 may have "counter comments" to the annotations about the color of the car. The "counter comments" may be comments that are directed towards the price of the paint color, availability of the paint color, and/or any other comment that provide further meaning to the annotations about the color of the car. Branch (3) 514 is separate from branch (1) 510 and branch (2) 512. The annotations within branch (3) 514 are a separate set of annotations that may provide comments on the selling price of the car. These annotations do not comment on the color or price of a paint color and, therefore, are a separate branch of annotations (e.g. logically grouped by different criteria). Because branch (3) 514 does not relate back to branch (1) 510 and branch (2) 512, branch (3) 514 is displayed in a manner where branch (3) 514 does not branch off of branch (1) 510 and branch (2), but branches off of the timeline 504.

Annotation branches and/or annotation thumbnails may be presented to the user based upon the time in which they were created in relationship to a time location along the timeline 504. For example, an annotation branch may be spatially located near the timeline 504 at a position representing the time the annotations within the annotation branch were created. Annotation branches and/or annotation thumbnails may be further displayed and/or filtered based upon a criterion. One criterion may be a zoom state (e.g. display larger or smaller chunks of time). If a user zooms into a zoom state, more annotation branches may be displayed around a specific area of the timeline. The annotation branches may display more detailed information depending on the zoom state. Another criterion may be a filter criterion. A user may filter what annotations, annotation thumbnails, and/or annotation branches are displayed. The filter may be based upon a time interval, spatial relationship, annotation density, text recognition of a keyword, hotspot areas, and/or any other filtering criterion. Another example of a criterion is where the user wants to hide annotations created by the user and the user only wants 2 levels deep of annotation branches displayed.

The timeline auxiliary display 502 may present to the user a hotspot marker 520. The hotspot marker 520 provides an indication to the user that the location on the timeline 504 near the hotspot marker 520 has prominence (e.g. the location comprises highly relevant annotation). Hotspot markers may be designated by users that mark a specific annotation and/or areas of annotation that have prominence. One method to create hotspot markers is where users have the ability to vote an area as "hot". Depending on the vote, the area on the timeline representing the "hot" area is marked with a hotspot marker. Hotspot markers allow a user to quickly find areas of annotations that are of high relevance. This helps a user review a large amount of annotations (e.g. an entire days worth) without having to review the entire collection of annotations.

A background gradient (e.g. gradient density (1) 516 and gradient density (2) 518) indicates the annotation density within the timeline 504. For example, gradient density (1) 516 is darker than the timeline 504. The area of the timeline where gradient density (1) 516 is located may have a dense amount of annotations comprised within that area of the timeline 504 (e.g. a large number of annotations were created within the time period corresponding to the area of the timeline). Gradient density (2) 518 is darker than the timeline 504 and gradient density (1) 516. The area of the timeline 504 where gradient density (2) 518 is located may comprise a very dense amount of annotations. Gradient density provides a user the ability to quickly recognized areas of time where a large amount of annotations may have been created.

It may be appreciated that the ambient display 522 may also be a small auxiliary display that is located in the same (e.g. within the same display) and/or different location (e.g. presented on a separate display) as the timeline auxiliary display 502. The timeline auxiliary display 502 may be configured to present the hierarchical annotation data (timeline, thumbnails, and annotation branches) through a user control.

The small auxiliary display may display the output from the user control of the timeline auxiliary display 502.

Figure 6:
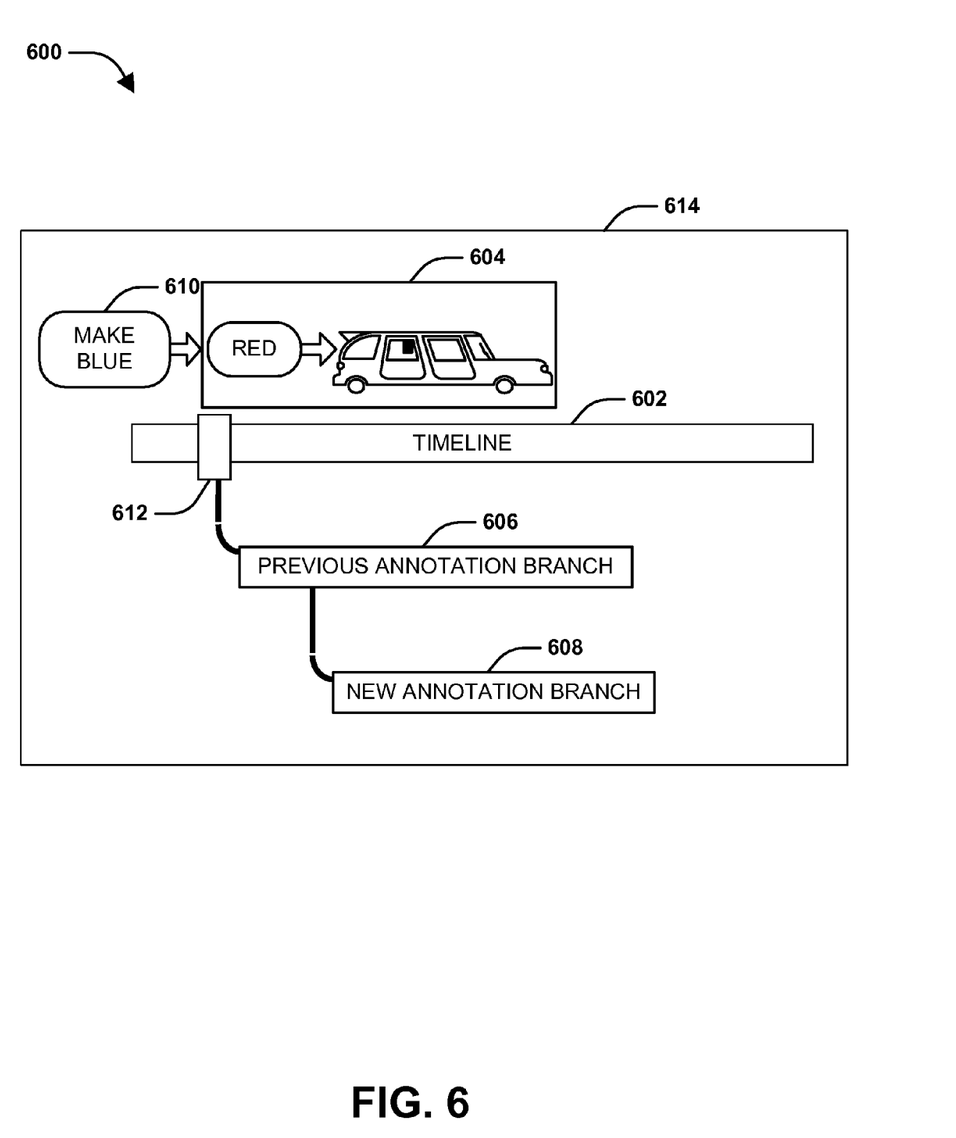
FIG. 6 is an illustration of an example of creating a new annotation branch subordinate to a previous annotation branch of previously record annotations.

FIG. 6 illustrates an example 600 of creating a new annotation branch 608 subordinate to a previous annotation branch 606 of previously record annotations. Example 600 is a simplified example of a hierarchical representation of annotations. It may be appreciated that a presentation of hierarchical annotations may be very complex (e.g. a complex tree of annotation branches may be presented; a multitude of annotation thumbnails may be present; the timeline may represent many annotations, annotation thumbnails, annotation branches distributed over a long period of time; etc.)

The timeline auxiliary display 614 presents a timeline 602, a timeline slider 612, an annotation thumbnail 604, and annotation branches (e.g. the new annotation branch 608 and the previous annotation branch 606). The timeline slider 612 allows a user to move along the timeline 602. The timeline slider 612 may correspond to an output that displays annotation information to the user that is associated with the position of the timeline slider 612. The previous annotation branch 606 may comprise a set of recorded annotations that are logically grouped. The set of recorded annotation are grouped annotation within a plurality of recorded annotations that may correspond to a specific area (e.g. time interval, specific time) on the timeline 602. The set of recorded annotations may comprise an annotation represented by the annotation thumbnail 604. The annotation thumbnail 604 may be displayed to the user because it provides the user with additional image information about a recorded annotation within the previous annotation branch 606.

As the user reviews the recorded annotations within the timeline 602, the user may add additional annotations or comments (e.g. a new annotation 610) to previously recorded annotations. The new annotation 610 is added by the user as an annotation that comments on the annotation thumbnail 604. The new annotation 610 provides further context to the annotation thumbnail 604 that the car is to be made blue (not red). Preserving the relationship of new annotation 610 and the annotation thumbnail 604 (the annotation the annotation thumbnail 604 represents), allows a subsequent user to perceive through a hierarchical display the relationship and context in which the annotations were created.

When the user creates new annotation 610, the new annotation branch 608 is created. The new annotation branch 608 is presented as a subordinate annotation branch in relation to the previous annotation branch 606. Displaying the new annotation branch 608 subordinate to the previous annotation branch 606 provides a hierarchical representation of annotations. The user may interpret subordinate annotation branches as annotations that comment on a previous annotation and/or set of annotations (e.g. a pervious annotation branch). Furthermore, if another annotation is created that does not relate back or comment on a previous annotation, then an annotation branch may be created that is not subordinate to another annotation branch. The non subordinate annotation branched (represented by a different logical grouping) may be presented to the user as a branch connecting to the timeline and not to other annotation branches. An interaction component and history component may handle the creation, storing, and presenting of the new annotation branch.

Figure 7:
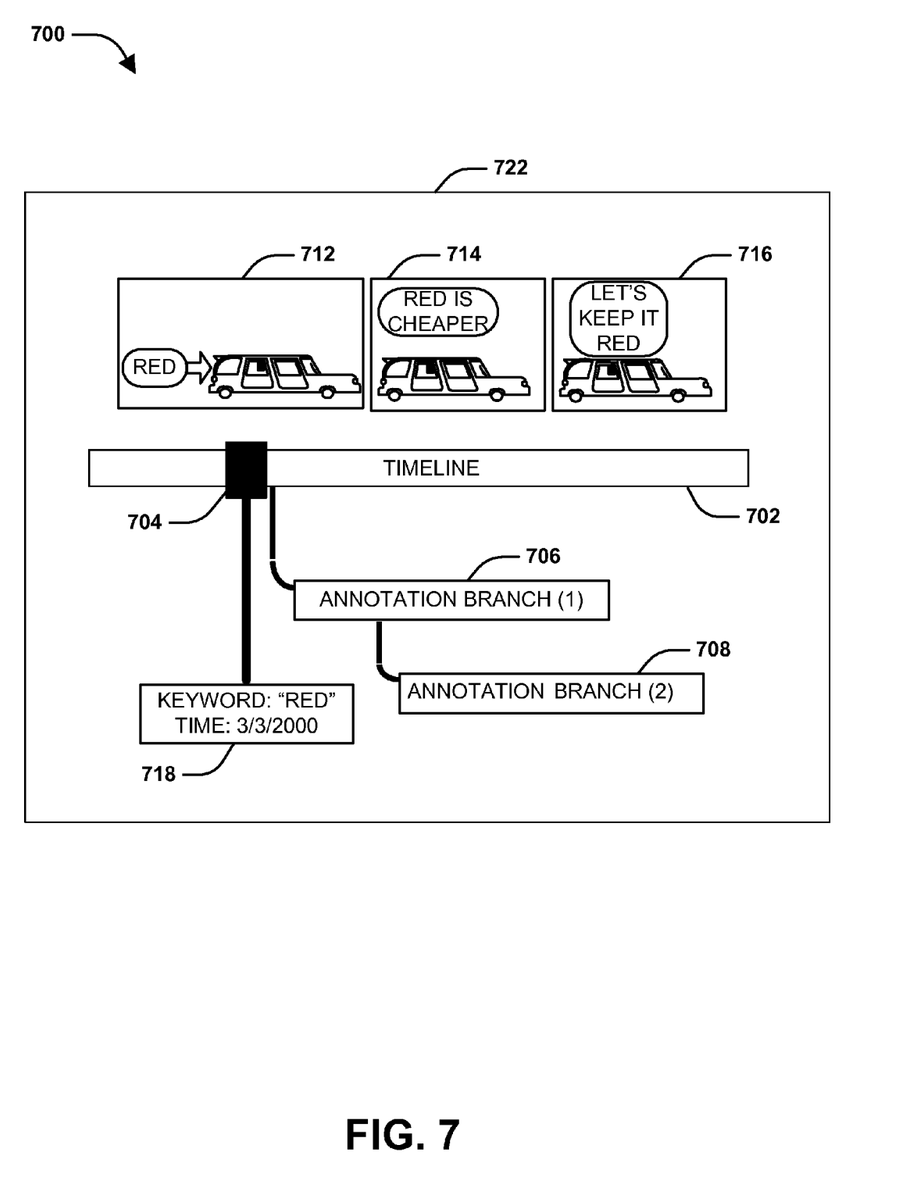
FIG. 7 is an illustration of an example of presenting a hierarchical representation of a plurality of recorded annotations.

FIG. 7 illustrates an example 700 of presenting a hierarchical representation of a plurality of recorded annotations. A timeline auxiliary display 722 presents a timeline 702, a timeline slider 704, annotation thumbnails (e.g. a thumbnail (1) 712, a thumbnail (2) 714, and a thumbnail (3) 716), and annotation branches (e.g. an annotation branch (1) 706 and an annotation branch (2) 708). A user display criteria 718 comprises a keyword "RED" and a time interval "3/3/2000". The user display criteria 718 may be defined by user input, default setting, and/or any other criteria for filtering and/or sorting annotation branches and thumbnails.

The user is presented with annotation branches and thumbnails that correspond to the user display criteria 718. Annotation thumbnails and annotation branches that comprise the keyword "RED" and/or were created within the time interval "3/3/2000" are presented to the user. The user display criteria 718 may be used as a filtering mechanism for thumbnails and annotation branches. Filtering allows a user to quickly locate specific thumbnails and annotation branches that correspond to a desired set of annotations.

Annotation branch (1) 706 and annotation branch (2) 708 are presented to the user in a hierarchical manner. Annotation branch (2) 708 is displayed subordinate to annotation branch (1) 706 (e.g. annotation branch (2) 708 is connected in a visual manner to annotation branch (1) 706 to indicates both branches are logically grouped separately). Annotation branch (2) 708 may be displayed subordinate to annotation branch (1) 706 to provide context because the annotations within annotation branch (2) 708 comment on (relate back to) annotations within annotation branch (1) 706. Users also have the ability to merge and/or compare annotation branches. This allows a user reviewing annotations to reorganize how recorded annotations are grouped into branches and/or are organized.

The timeline auxiliary display 722 may be configured to output annotation information to a secondary display. The timeline slider 704 may be used to output annotation information that corresponds to the location of the timeline slider 704 within the timeline 702.

Figure 8:
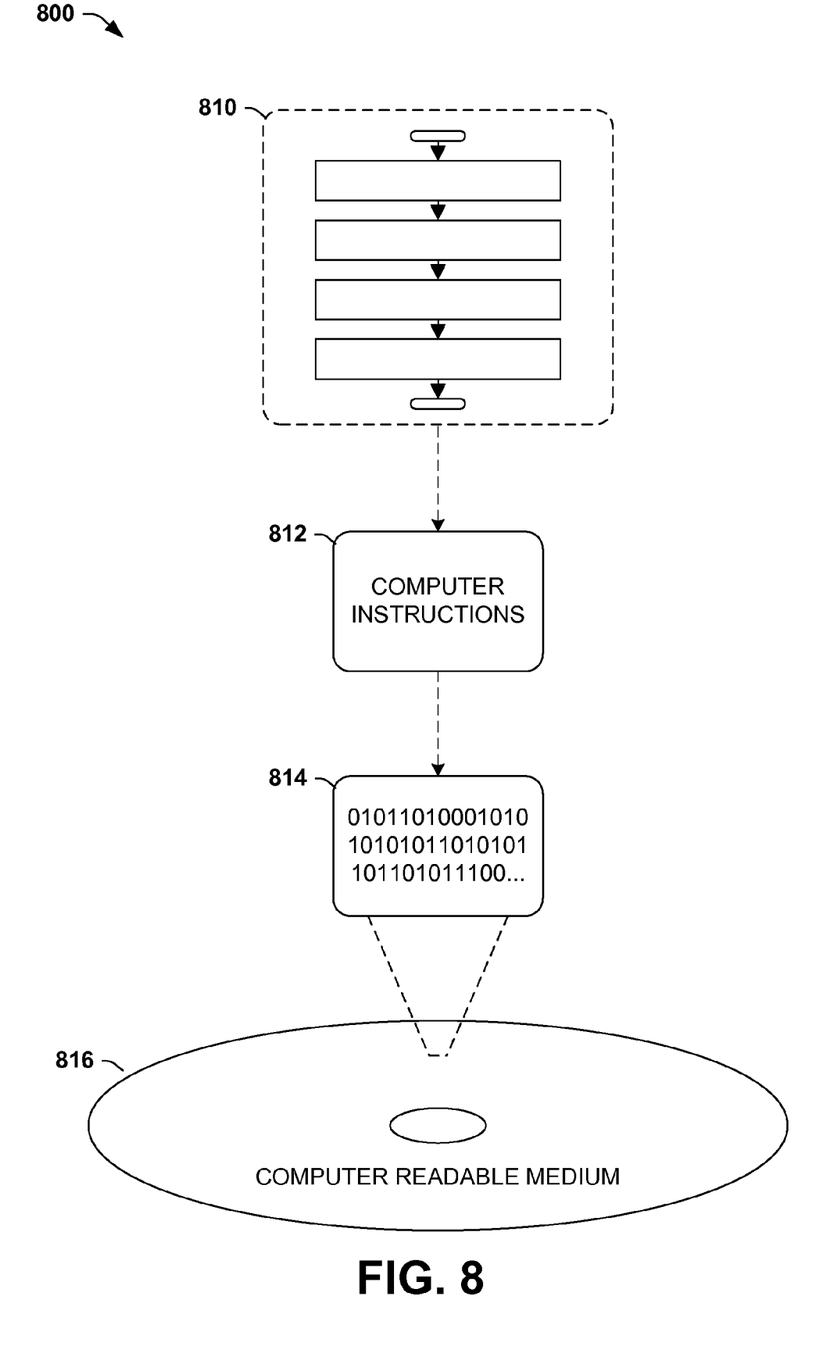
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 100 of FIG. 1, for example. In another such embodiment, the processor-executable instructions 814 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
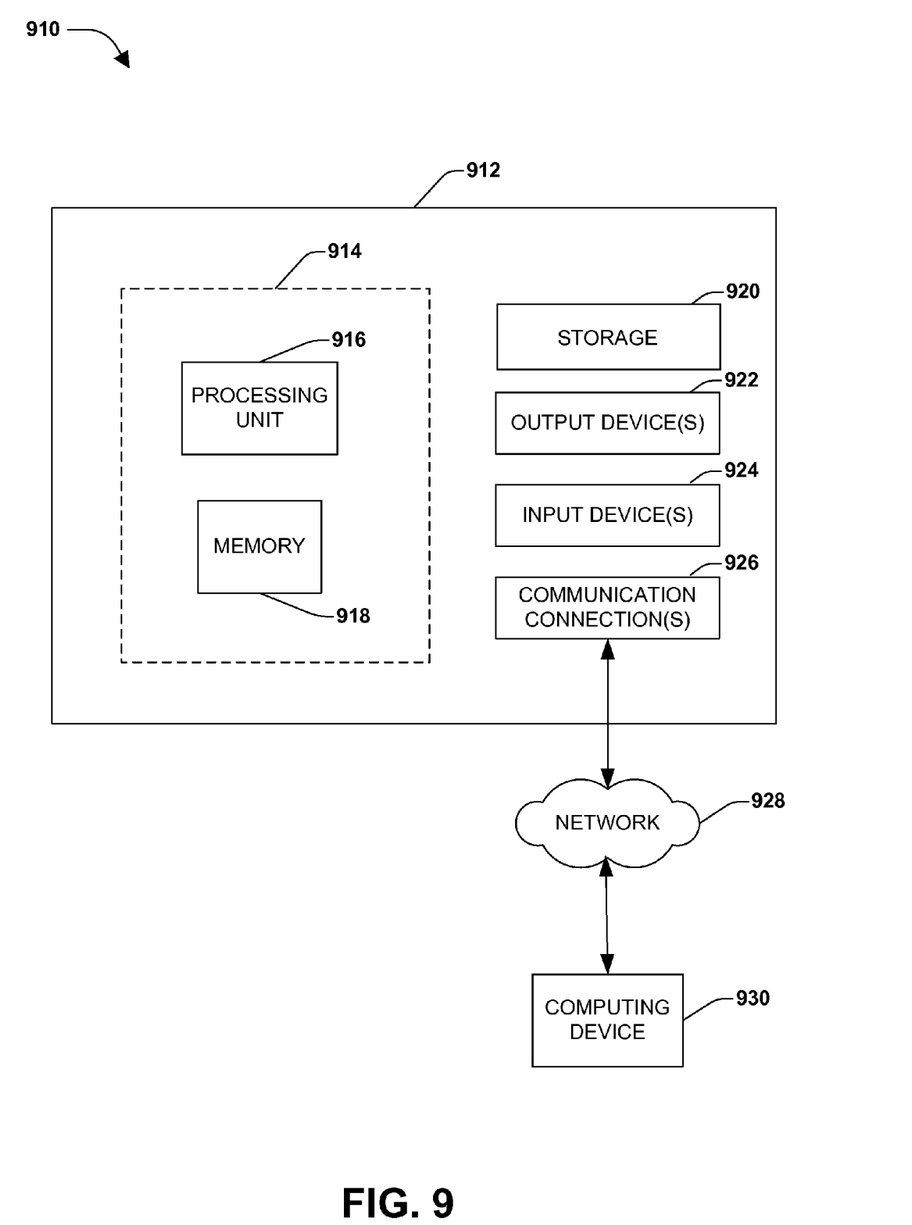
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for presenting a hierarchical representation of a plurality of recorded annotations, comprising:
   logically organizing a first annotation and a second annotation into a first annotation branch based upon determining that the first annotation and the second annotation were created within a threshold physical distance of one another, the first annotation positioned relative to the second annotation within the first annotation branch based upon a spatial proximity between the first annotation and the second annotation on a display within which the first annotation and the second annotation were created;
   logically organizing a third annotation and a fourth annotation into a second annotation branch; and
   presenting, on an ambient display, the first annotation branch and the second annotation branch within a hierarchical representation comprising a hierarchical timeline such that the second annotation branch branches off of the first annotation branch based upon a determination that at least one of:
      the third annotation comments textually on at least one of the first annotation or the second annotation; or
      the fourth annotation comments textually on at least one of the first annotation or the second annotation,
   at least one of the first annotation branch or the second annotation branch presented at a particular location within the hierarchical representation based upon predetermined criteria comprising at least one of a spatial density of annotations or a zoom state,
   where responsive to placement of a timeline marker on a first location on the ambient display associated with a first time, at least one of one or more annotations or one or more objects corresponding to the first time are displayed,
   at least one of the first annotation, the second annotation, the third annotation or the fourth annotation comprising at least one of electronic ink, audio, text, or video.

2. The method of claim 1, comprising highlighting a portion of the first annotation branch based upon the portion comprising an annotation density above a threshold, the annotation density comprising a temporal density.

3. The method of claim 1, comprising highlighting a portion of the first annotation branch based upon the portion comprising an annotation density above a threshold, the annotation density comprising a spatial density.

4. The method of claim 1, comprising highlighting a portion of the second annotation branch based upon the portion comprising an annotation density above a threshold, the annotation density comprising a temporal density.

5. The method of claim 1, comprising highlighting a portion of the second annotation branch based upon the portion comprising an annotation density above a threshold, the annotation density comprising a spatial density.

6. The method of claim 1, at least one of the first annotation or the second annotation comprising at least one of a deleted annotation or an overlapping annotation.

7. The method of claim 1, the hierarchical representation displayed horizontally.

8. The method of claim 1, the logically organizing a first annotation and a second annotation into a first annotation branch comprising:
   logically organizing the first annotation and the second annotation into the first annotation branch based upon determining that the first annotation and the second annotation were created within a threshold time span of one another.

9. The method of claim 1, comprising:
   presenting a thumbnail comprising a snapshot image representing the first annotation within the first annotation branch.

10. The method of claim 1, comprising highlighting a portion of the first annotation branch based upon the portion being designated as being highly relevant by one or more users.

11. The method of claim 1, comprising highlighting a portion of the second annotation branch based upon the portion being designated as being highly relevant by one or more users.

12. The method of claim 1, comprising:
   merging at least one of the first annotation branch or the second annotation branch with another annotation branch within the hierarchical representation based upon user input.

13. The method of claim 1, comprising:
   creating a new annotation branch within the hierarchical representation based upon user input associated with the hierarchical representation.

14. A system, implemented at least in part via a processing unit, for presenting a hierarchical representation of a plurality of recorded annotations, comprising:
 a branch component configured to:
  logically organize a first annotation and a second annotation into a first annotation branch based upon determining that the first annotation and the second annotation were created within a threshold physical distance of one another, the first annotation positioned relative to the second annotation within the first annotation branch based upon a spatial proximity between the first annotation and the second annotation on a display within which the first annotation and the second annotation were created; and
  logically organize a third annotation and a fourth annotation into a second annotation branch; and
 a presentation component configured to:
  present the first annotation branch and the second annotation branch within a hierarchical representation such that the second annotation branch branches off of the first annotation branch based upon a determination that at least one of:
   the third annotation comments textually on at least one of the first annotation or the second annotation; or
   the fourth annotation comments textually on at least one of the first annotation or the second annotation,
  at least one of the first annotation branch or the second annotation branch presented at a particular location within the hierarchical representation based upon predetermined criteria comprising at least one of a spatial density of annotations or a zoom state,
  where responsive to placement of a timeline marker on a first location associated with a first time, at least one of one or more annotations or one or more objects corresponding to the first time are displayed,
  at least one of the first annotation, the second annotation, the third annotation or the fourth annotation comprising at least one of electronic ink, audio, text, or video.

15. The system of claim 14, at least one of the first annotation or the second annotation comprising a graphic object, at least one of the third annotation or the fourth annotation comprising a textual comment.

16. The system of claim 14, at least one of the first annotation or the second annotation comprising data recorded from physical markings on the display.

17. The system of claim 14, the branch component configured to:
 logically organize the first annotation and the second annotation into the first annotation branch based upon determining that the first annotation and the second annotation were created within a threshold time span of one another.

18. A computer readable medium, excluding signals, comprising instructions that when executed perform a method for presenting a hierarchical representation of a plurality of recorded annotations from an ambient display, the method comprising:
 logically organizing one or more annotations into a first annotation branch, the first annotation branch comprising a first annotation positioned relative to a second annotation within the first annotation branch based upon a spatial proximity between the first annotation and the second annotation on an ambient display upon which the first annotation and the second annotation were created;
 logically organizing a third annotation and a fourth annotation into a second annotation branch; and
 presenting the first annotation branch and the second annotation branch within a hierarchical representation comprising a hierarchical timeline such that the second annotation branch branches off of the first annotation branch based upon a determination that at least one of:
  the third annotation comments textually on at least one of the first annotation or the second annotation; or
  the fourth annotation comments textually on at least one of the first annotation or the second annotation,
 at least one of the first annotation branch or the second annotation branch presented at a particular location within the hierarchical representation based upon predetermined criteria comprising at least one of a spatial density of annotations or a zoom state,
 where responsive to placement of a timeline marker on a first location associated with a first time, at least one of the one or more annotations or one or more objects corresponding to the first time are displayed,
 at least one of the first annotation, the second annotation, the third annotation or the fourth annotation comprising at least one of electronic ink, audio, text, or video.

19. The computer readable medium of claim 18, at least one of the first annotation or the second annotation comprising at least one of a deleted annotation or an overlapping annotation.

20. The computer readable medium of claim 18, the predetermined criteria comprising the zoom state.

* * * * *